United States Patent [19]
Bando

[11] Patent Number: 5,517,090
[45] Date of Patent: May 14, 1996

[54] S-CORRECTION CAPACITOR SWITCHING FOR A DISPLAY MONITOR

[75] Inventor: Takahiro Bando, Nagasaki, Japan

[73] Assignee: Mitsubishi Denki Kabushiki Kaisha, Tokyo, Japan

[21] Appl. No.: 449,734

[22] Filed: May 25, 1995

[30] Foreign Application Priority Data

May 30, 1994 [JP] Japan .................................. 6-116949

[51] Int. Cl.$^6$ ................................................. H01J 29/56
[52] U.S. Cl. ........................................ 315/370; 315/408
[58] Field of Search ..................................... 315/408, 370; 348/806

[56] References Cited

U.S. PATENT DOCUMENTS

| | | |
|---|---|---|
| 4,673,984 | 6/1987 | Kikuchi et al. . |
| 4,709,193 | 11/1987 | Dietz ........................................ 315/408 |
| 5,155,417 | 10/1992 | Tateishi ..................................... 315/371 |

FOREIGN PATENT DOCUMENTS

| | | |
|---|---|---|
| 61-242172 | 10/1986 | Japan . |
| 3-185488 | 8/1991 | Japan . |
| 4-35364 | 2/1992 | Japan . |

OTHER PUBLICATIONS

*Patent Abstracts of Japan*, vol. 16, No. 92, p. 85, Mar. 6, 1992, (JP3–273283).

Primary Examiner—Theodore M. Blum
Attorney, Agent, or Firm—Burns, Doane, Swecker & Mathis

[57] ABSTRACT

A S-correction capacitor switching apparatus for a display monitor, comprising a control unit which sets a plurality of switching devices in a conductive state immediately before the power of a display monitor is turned on, controls the conductive/nonconductive state of the switching device corresponding to the horizontal frequency after the horizontal frequency of a horizontal deflection circuit set according to the frequency of a horizontal synchronizing signal of an input video signal is stabilized after the power is turned on, and connects a S-correction capacitor suitable for the frequency of the horizontal synchronizing signal of the input video signal to a deflection coil.

7 Claims, 8 Drawing Sheets

FIG. 3

| FREQUENCY OF HORIZONTAL SYNCHRONIZING SIGNAL | HORIZONTAL FREQUENCY INFORMATION | SWITCHING DEVICE CONTROL SIGNAL | |
|---|---|---|---|
| | | S1 | S2 |
| HS 1 | HO 1 | 1 | 1 |
| HS 2 | HO 2 | 1 | 0 |
| ⋮ | ⋮ | ⋮ | ⋮ |
| HS (N-1) | HO (N-1) | 0 | 1 |
| HS N | HO N | 0 | 0 |

TL

S-CORRECTION CAPACITOR SWITCHING FOR A DISPLAY MONITOR

BACKGROUND OF THE INVENTION (1) Field of the Invention

The present invention relates to a S-correction capacitor switching apparatus for a display monitor for switching S-correction capacitors coupled with a deflection coil depending on the frequency of a horizontal synchronizing signal of an input video signal.

(2) Description of the Prior Art

FIG. 1 is a circuit diagram showing the construction of a horizontal deflection circuit having a prior-art S-correction capacitor switching apparatus, disclosed in U.S. Pat. No. 4,709,193. In the Figure, the horizontal deflection circuit 1 includes a horizontal output transistor Q1, a resonance capacitor CR1, a damper diode D1, a horizontal deflection coil DY, a linearity coil LIN, a S-correction capacitor CS1, and a horizontal output transformer T1. Reference numeral 2 designates a part of a S-correction capacitor switching apparatus, reference symbols CS2 and CS3 designate S-correction capacitors to be switched, reference symbol Q2 designates a switching device for coupling the S-correction capacitor CS3 with the aforementioned S-correction capacitor CS1, and reference symbol Q3 designates a switching device for coupling the S-correction capacitor CS2 with the aforementioned S-correction capacitor CS1. The switching devices Q2 and Q3 each comprise a field effect transistor (FET). Reference symbol R1 designates a resistor coupled between the drain and source of the switching device Q3 and reference symbol R2 designates a resistor coupled between the drain and source of the switching device Q2. Reference symbol S1 designates a switching device control signal for controlling the conductive/nonconductive state of the switching device Q2 in accordance with the frequency of the horizontal synchronizing signal of an input video signal and reference symbol S2 designates a switching device control signal for controlling the conductive/nonconductive state of the switching device Q3 in accordance with the frequency of the horizontal synchronizing signal of an input video signal. Numeral 3 designates a variable power supply capable of changing voltage to be supplied to the horizontal deflection circuit 1 in accordance with horizontal frequency.

Operation of the circuit shown in FIG. 1 will now be described. When the frequency of the horizontal synchronizing signal of an input video signal changes, it is necessary to correct deterioration of the linearity of a display screen depending on the frequency of the horizontal synchronizing signal of an input video signal by changing the capacitance of the S-correction capacitor. Thus, the S-correction capacitors CS2 and CS3 are coupled in parallel with the S-correction capacitor CS1, which operates in wide horizontal frequency range of the horizontal deflection circuit 1, so as to correct the linearity of the displayed image corresponding to each predetermined horizontal frequency. In this case, the conductive/nonconductive state of the switching device Q3 coupled in series with the S-correction capacitor CS2 is controlled by the switching device controlling signal S2, and the conductive/nonconductive state of the switching device Q2 coupled in series with the S-correction capacitor CS3 is controlled by the switching device controlling signal S1 depending on the horizontal frequency, to correct the linearity of a display screen at each horizontal frequency.

Resistors R1 and R2 which are coupled between the drain and source of the aforementioned switching devices Q2 and Q3, respectively, are provided to prevent the switching devices Q2 and Q3 from being deteriorated due to an excessive voltage applied to the drains of the switching devices Q2 and Q3 because charged voltage occurs between the drain and source of each of the switching devices Q2 and Q3 when power is turned on under the condition that the switching devices Q2 and Q3 are in their nonconductive state or when the horizontal frequency changes. The resistors R1 and R2 discharge DC voltage components applied to the switching devices Q2 and Q3, thereby enabling use of the switching devices to be those having a low withstand voltage characteristic, and then realizing reduction of the cost of the apparatus.

Since the S-correction capacitor switching apparatus in the prior art display monitor has the above-described construction, it is possible to suppress, by discharging, the DC voltage components generated at the drains of the switching devices Q2 and Q3. However, because the oscillation frequency of the horizontal output circuit becomes unstable particularly when the power is turned on or off, there is a problem in that, if the capacitance of a selected S-correction capacitor is not suitable, an excessive voltage is applied to the drains of the switching device so that the FETs, which act as switches, may be damaged.

SUMMARY OF THE INVENTION

Accordingly, an object of the present invention is to solve the above-described problem and to provide a S-correction capacitor switching apparatus for a display monitor, which is capable of preventing deterioration of switching devices for switching S-correction capacitors when the power for the switching devices is turned on.

Another object of the present invention is to provide a S-correction capacitor switching apparatus for a display monitor, which is capable of preventing deterioration of switching devices which are horizontal output transistors.

The S-correction capacitor switching apparatus for a display monitor according to the first aspect of the present invention comprises control means for placing all of a plurality of switching devices to be in the conductive state immediately before the display monitor is powered on, for controlling the conductive/nonconductive state of the aforementioned switching devices according to the horizontal frequency of a horizontal deflection circuit after the horizontal frequency of the horizontal deflection circuit set according to the frequency of the horizontal synchronizing signal of an input video signal after the power is turned on is stabilized, and for outputting a switching device control signal for coupling a S-correction capacitor suitable for the frequency of the horizontal synchronizing signal of the input video signal with a deflection coil.

As stated above, the control means in the S-correction capacitor switching apparatus for a display monitor according to the first aspect of the present invention places all of a plurality of switching devices to be in the conductive state immediately before the display monitor is powered on, controls the conductive/nonconductive state of the aforementioned switching devices according to the horizontal frequency of a horizontal deflection circuit after the horizontal frequency of a horizontal deflection circuit set according to the frequency of the horizontal synchronizing signal of an input video signal after the power is turned on is stabilized, and couples a S-correction capacitor suitable for the frequency of the horizontal synchronizing signal of the input video signal with a deflection coil, thereby preventing deterioration of the switching devices when the power is turned on.

According to a second aspect of the present invention, there is provided a S-correction capacitor switching apparatus for a display monitor comprising, in addition to the construction according to the first aspect, detecting means for detecting the frequency of the horizontal synchronizing signal of an input video signal and setting means for setting the horizontal frequency of the horizontal deflection circuit depending on a horizontal synchronizing signal detected by the aforementioned detecting unit.

As stated above, the S-correction capacitor switching apparatus for a display monitor according to the second aspect of the present invention places all of the plurality of switching devices to be in the conductive state immediately before the display monitor is powered on, sets the horizontal frequency of a horizontal deflection circuit corresponding to the frequency of the horizontal synchronizing signal of an input video signal after the power is turned on, controls the conductive/nonconductive state of the aforementioned switching device according to a horizontal frequency set in the aforementioned manner after the horizontal frequency is stabilized, and then couples a S-correction capacitor suitable for the frequency of the horizontal synchronizing signal of an input video signal with a deflection coil, thereby preventing deterioration of the switching devices when the power is turned on.

According to a third aspect of the present invention, there is provided a S-correction capacitor switching apparatus for a display monitor comprising, in addition to the construction in the second aspect, determining means for determining whether the horizontal frequency set as mentioned above is stabilized from the fact that a predetermined time has elapsed since the setting means sets a horizontal frequency.

As stated above, the S-correction capacitor switching apparatus for a display monitor according to the third aspect of the present invention places all of the plurality of the switching devices to be in the conductive state immediately before the display monitor is powered on, sets the horizontal frequency of a horizontal deflection circuit corresponding to the frequency of the horizontal synchronizing signal of an input video signal after the power is turned on, determines whether the horizontal frequency is stabilized from the fact that a predetermined time has elapsed since the frequency is set, controls the conductive/nonconductive states of the aforementioned switching devices according to the horizontal frequency set in the aforementioned manner thereafter, and then couples a S-correction capacitor suitable for the frequency of the horizontal synchronizing signal of an input video signal with the deflection coil, thereby preventing deterioration of the switching device when the power is turned on.

According to the fourth aspect of the present invention, there is provided a S-correction capacitor switching apparatus for a display monitor comprising controlling means for placing, based on switching device control signals, all of the plurality of the switching devices to be in the conductive state when operation for turning off the power of the display monitor is performed, and then for turning off the power of the display monitor.

As stated above, the S-correction capacitor switching apparatus for a display monitor places all of the plurality of the switching devices in the conductive state based on the switching device control signals when operation for turning off the power of the display monitor is performed and then turns off the power of the aforementioned display monitor, thereby preventing deterioration of the switching devices for switching the S-correction capacitor when the power is turned off.

According to the fifth aspect of the present invention, there is provided a S-correction capacitor switching apparatus for a display monitor comprising a switching device protective circuit for introducing, when the switching devices are in their nonconductive states at the time when the power of a display monitor is turned on or off, a voltage higher than that at a conjunction point between the switching device and the S-correction capacitor into control terminals of the switching devices to which switching device control signals are input, so that the switching devices are transferred into the conductive states.

As stated above, in the S-correction capacitor switching apparatus for a display monitor according to the fifth aspect of the present invention, when the switching devices are in their nonconductive states at the time when the power of a display monitor is turned on or off, a voltage higher than that at a conjunction point between the switching device and the S-correction capacitor is introduced into the control terminal of a switching device to which a switching device control signal is input, so that the switching device is transferred into the conductive state, thereby preventing deterioration of the switching devices for switching the S-correction capacitor when the power is turned on or off.

According to the sixth aspect of the present invention, there is provided a S-correction capacitor switching apparatus for a display monitor comprising a switching device protective circuit for introducing, when the switching devices are in their nonconductive states at the time when the power of a display monitor is turned on or off, a voltage higher than that at a conjunction point between a plurality of S-correction capacitors into the control terminals of switching devices to which switching device control signals are input, so that the switching devices are transferred into the conductive states.

As stated above, in the S-correction capacitor switching apparatus for a display monitor according to the sixth aspect of the present invention, when the switching devices are in their nonconductive states at the time when the power of a display monitor is turned on or off, a voltage higher than that at a conjunction point between the plurality of the S-correction capacitors is introduced into the control terminals of the switching devices to which switching device control signals are input, so that the switching devices are transferred into the conductive states, thereby preventing deterioration of the switching devices for switching the S-correction capacitor when the power is turned on or off.

According to the seventh aspect of the present invention, there is provided a S-correction capacitor switching apparatus for a display monitor comprising detecting means for detecting the frequency of the horizontal synchronizing signal of an input video signal, a horizontal frequency switching circuit for switching the horizontal frequency of a horizontal deflection circuit according to the detected frequency, a S-correction capacitor switching circuit for switching the S- correction capacitor to be coupled with the deflection coil by controlling the conductive/nonconductive state of the switching devices by means of a switching device control signal, and switching timing control means for controlling the horizontal frequency switching circuit and the S-correction capacitor switching circuit according to an inverse time relationship between switching of a horizontal frequency by means of a horizontal frequency switching circuit and switching of the conductive/nonconductive state of the switching device by means of a switching device control signal corresponding to each time of when a frequency detected by the detecting means changes from a low frequency to a high frequency or when it changes from a high frequency to a low frequency.

As stated above, the switching timing control means of the S-correction capacitor switching apparatus for a display monitor controls the horizontal frequency switching circuit and the S-correction capacitor switching circuit so as to inverse timely relationship between switching of the oscillation frequency of a horizontal deflection circuit and switching of the conductive/nonconductive state of a switching device by means of a switching device control signal corresponding to each time of when a frequency detected by the detecting means changes from a low frequency to a high frequency or when it changes from a high frequency to a low frequency, thereby preventing deterioration of the switching device which is a horizontal output transistor.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 3 is an explanatory diagram showing a table TL for the S-correction capacitor switching apparatus for a display monitor according to an embodiment of the present invention;

DESCRIPTION OF THE PREFERRED EMBODIMENTS

Figure 1:
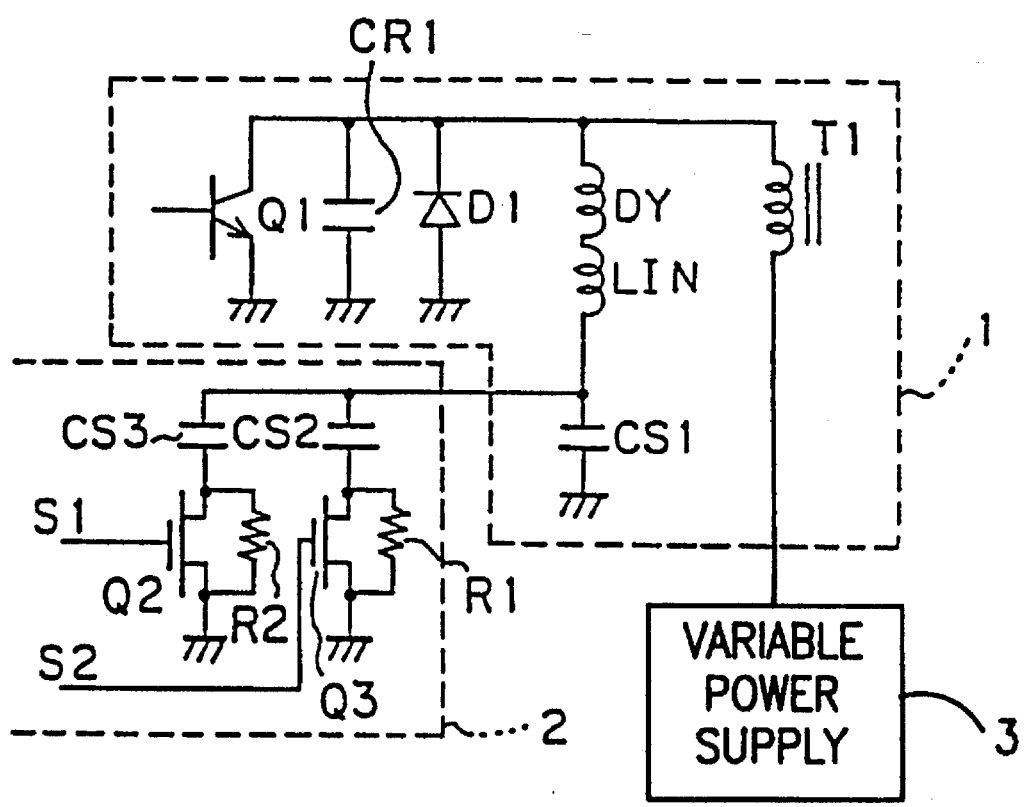
FIG. 1 is a circuit diagram showing the construction of a horizontal deflection circuit containing a prior art S-correction capacitor switching apparatus disclosed in U.S. Pat. No. 4,709,193.
Figure 2:
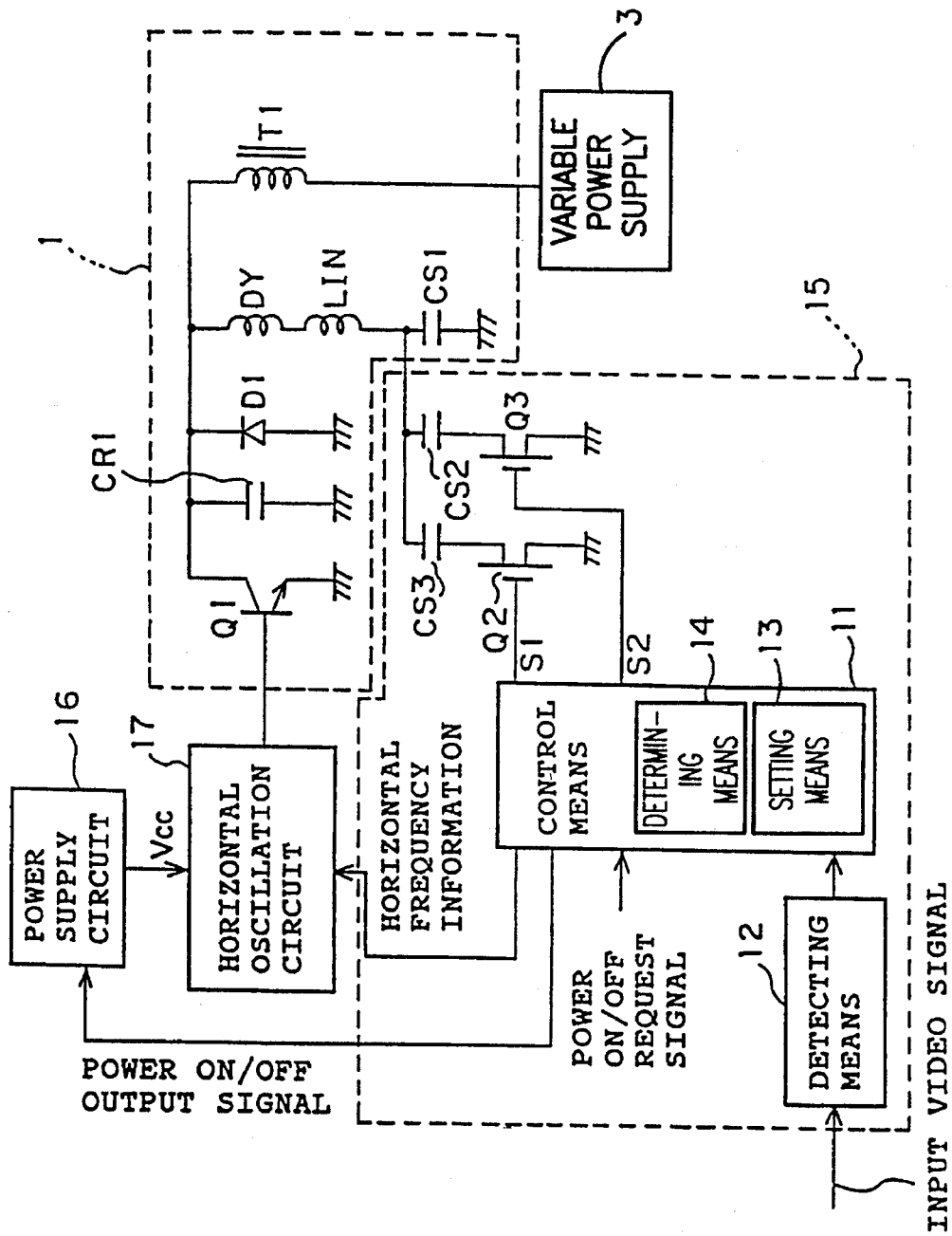
FIG. 2 is a block circuit diagram showing the S-correction capacitor switching apparatus for a display monitor according to an embodiment of the present invention.

Hereinafter, an embodiment of the present invention will be described with reference to accompanying drawings. FIG. 2 is a circuit block diagram showing the construction of a S-correction capacitor switching apparatus for a display monitor according to this embodiment. In FIG. 2, the same reference numerals and symbols are attached to the same components as and equivalent components to those of FIG. 1 and the description thereof is omitted. According to this embodiment, no resistor is coupled between the drain and source of each of switching devices Q2 and Q3. Referring to FIG. 2, numeral 11 designates control means which is constructed by a microcomputer. Numeral 12 designates detecting means for detecting the frequency of a horizontal synchronizing signal by detecting and counting the horizontal synchronizing signal of an input video signal. Numeral 13 designates setting means for setting the horizontal frequency of a horizontal deflection circuit depending on the frequency of a horizontal synchronizing signal detected by the detecting means 12 and the conductive/nonconductive state of the switching devices Q2 and Q3.

FIG. 3 is an explanatory diagram showing a table TL for setting a horizontal frequency corresponding to the frequency of a detected horizontal synchronizing signal. This table TL is contained in a ROM (not shown).

Referring back to FIG. 2, numeral 14 designates determining means for determining whether or not a predetermined time has elapsed since a horizontal frequency is set. According to this embodiment, the setting means 13 and the determining means 14 are realized by means of software. Additionally, the detecting means 12 can be realized by means of software. Numeral 15 designates a S-correction capacitor switching apparatus for a display monitor, including the control means 11, the detecting means 12, the switching devices Q2 and Q3 and the S-correction capacitors CS2 and CS3.

Numeral 16 designates a power supply circuit capable of controlling ON/OFF of the power Vcc of a horizontal oscillation circuit 17 by a power ON output signal or a power OFF output signal output from the control means 11. The horizontal oscillation circuit 17 includes a filter circuit for generating DC voltage corresponding to horizontal frequency information supplied from the control means 11 and a voltage controlling oscillator for outputting a frequency corresponding to the DC voltage generated by the filter circuit, and generates a signal for oscillating the horizontal deflection circuit 1 by a corresponding frequency according to the horizontal frequency information supplied from the control means 11 in order to supply the signal to the base terminal of a horizontal output transistor Q1.

Figure 4:
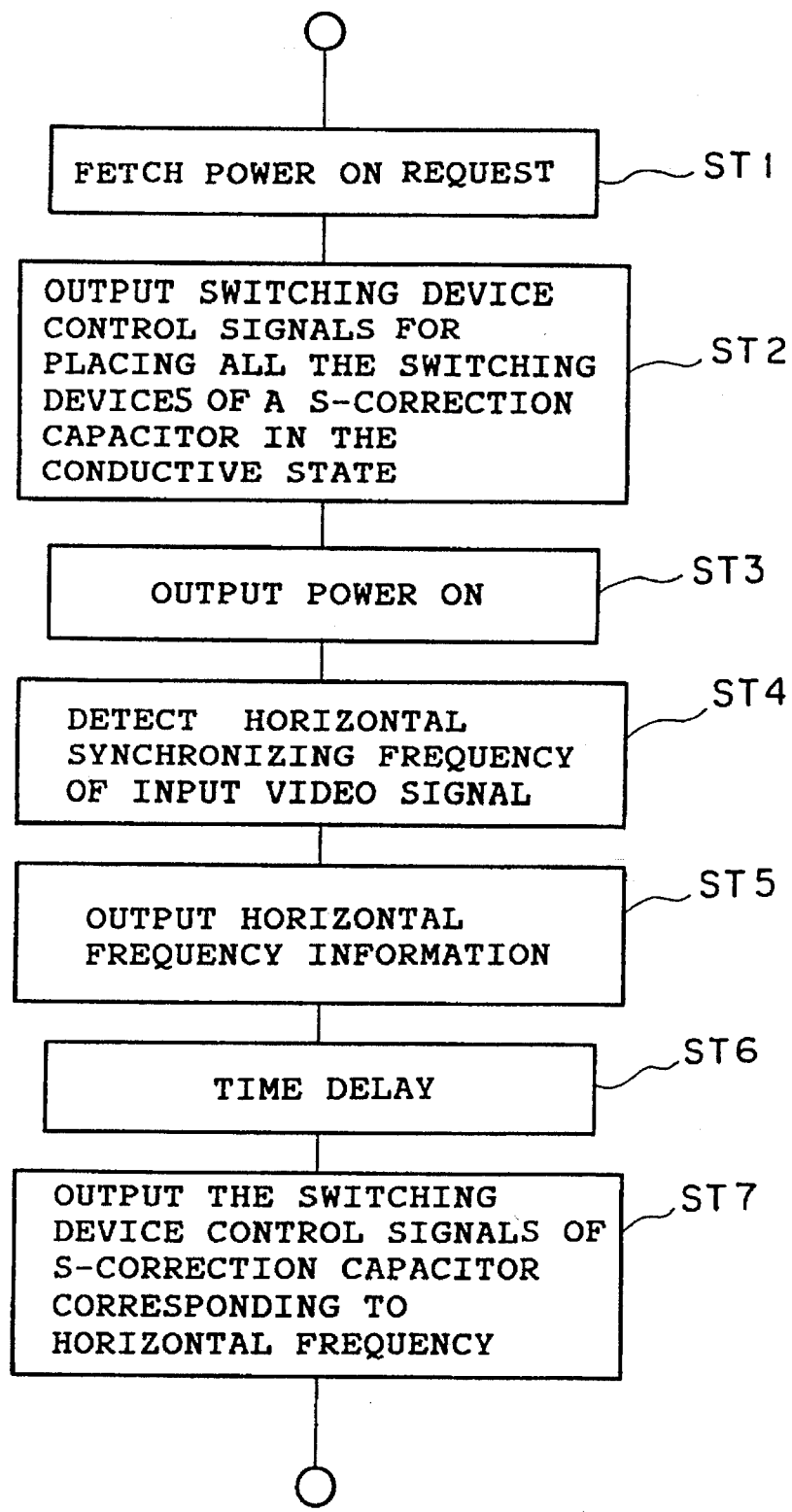
FIG. 4 is a flow chart showing the operation of the S-correction capacitor switching apparatus for a display monitor according to an embodiment of the present invention.

FIG. 4 is a flow chart showing the operation of the control means 11 when the power of a display monitor is turned on. A program shown by this flow chart is contained in a ROM (not shown). Hereinafter, the operation of the control means 11 when the power is turned on will be described with reference to this flow chart. In the S-correction capacitor switching apparatus 15 for a display monitor, when a power ON request signal for requesting the power to be turned ON transmitted from outside is fetched (step ST1), switching device control signals S1 and S2 for placing both the switching devices Q2 and Q3 to be the conductive state are output to the gate terminals of the switching devices Q2 and Q3 (step ST2). Then, a power ON output signal is output to the power supply circuit 16 on a successive step ST3 (step ST3).

At this time, even if the control means 11 outputs horizontal frequency information corresponding to the frequency of the horizontal synchronizing signal of an input video signal to the horizontal oscillation circuit 17 and further outputs a switching device control signal corresponding to the frequency of the aforementioned horizontal synchronizing signal, whether or not the horizontal oscillation circuit 17 and the horizontal deflection circuit 1 oscillate with frequencies corresponding to the aforementioned horizontal frequency information is not evident because they are in the transient state just after the power is turned on. Thus, it can be considered that the S-correction capacitor which has been switched by means of the switching devices Q2 and Q3 is in such a condition not suitable for actual oscillation frequency and there may be a switching device to which an excessive voltage is applied. However, because both the switching devices Q2 and Q3 are in the conductive state on the step ST2, no excessive voltage is applied to the switching devices Q2, Q3, thereby preventing deterioration of the switching device due to an excessive voltage applied when the power is turned on.

Namely, the detecting means 12 detects the frequency of the horizontal synchronizing signal of an input video signal on the next step ST4, refers to the table TL according to a detected frequency and reads horizontal frequency information, and the switching device control signals S1, S2, outputs horizontal frequency information to the horizontal oscillation circuit 17 and then sets the horizontal frequency of the horizontal deflection circuit 1 (step ST5). Consequently, the horizontal deflection circuit 1 starts oscillation by means of a set horizontal frequency and then continues oscillation for a predetermined time (predetermined time after a horizontal frequency is set) until the horizontal frequency is stabilized (step ST6). After that, a switching device control signal read from the aforementioned table TL is output to the switching devices Q2 and Q3 (step ST7) in order to switch the switching devices Q2, Q3.

Thus, immediately before the power is turned on, both the switching devices Q2 and Q3 are in the conductive state, and also the horizontal frequency of the horizontal deflection circuit 1 is in a stable state when the switching devices Q2 and Q3 are switched by means of a switching device control signal. Therefore, the value of the S-correction capacitor to be switched by the switching device corresponding to the horizontal frequency is suitable for a current horizontal frequency. Thus, no excessive voltage is applied to a switching device which is turned to the nonconductive state, thereby preventing deterioration of a switching device due to an excessive voltage applied to the switching device because of a transient change of the horizontal frequency when the power is turned on.

Figure 5:
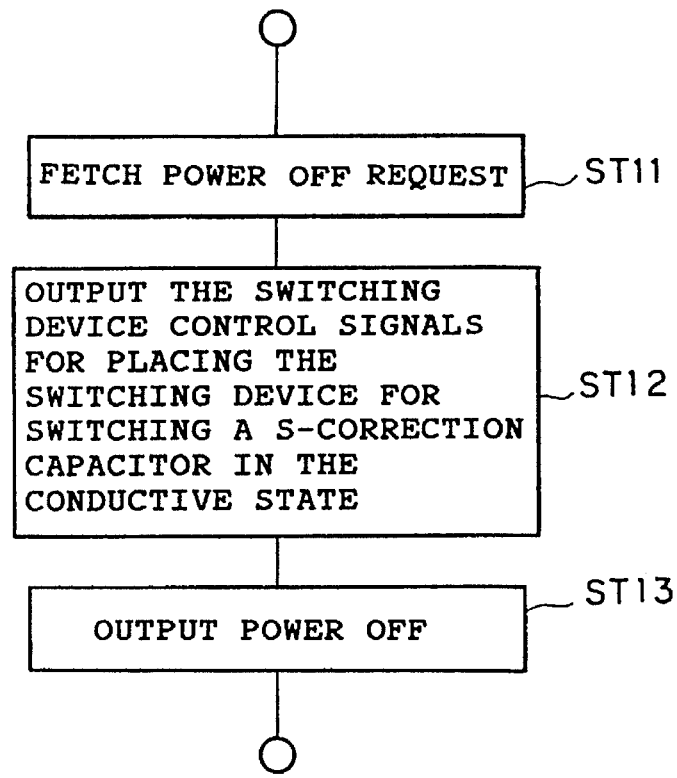
FIG. 5 is a flow chart showing the operation of the S-correction capacitor switching apparatus for a display monitor according to an embodiment of the present invention.

Next, the operation of the control means (power OFF control means) 11 when the power is turned off will be described. FIG. 5 is a flow chart showing the operation of the control means 11 when the power supply for a display monitor is turned off. A program shown by this flow chart is contained in a ROM (not shown) of the control means 11.

Immediately before the power is turned off, the horizontal frequency of the horizontal deflection circuit 1 is in a stable state. From this state, when the power is turned off, the horizontal frequency changes during a transition from power ON to power OFF so that the value of the S-correction capacitor may be unsuitable to the changed horizontal frequency. In the prior art, an excessive voltage may be applied to the switching device under a nonconductive state during this transition from power on to power OFF such that the switching device can be damaged. In contrast, according to the embodiment of the present invention, since the switching devices are previously turned on before turning off the power, no excessive voltage is applied to the switching device even when the value of the S-correction capacitor becomes unsuitable for the unstable horizontal frequency during the transition state from power on to power OFF, so that the switching device can be prevented from being damaged.

In more detail, when, at step ST1, a power OFF input or input of a power OFF request signal for turning off the power of a display monitor is detected (step ST11), switching device control signals S1 and S2 for placing the switching devices Q2 and Q3 to a conductive state are output to the gate terminals of the switch devices Q2 and Q3 (step ST12). Thereafter, a power OFF output signal is output to the power circuit 16 in order to turn off the power of the horizontal oscillation circuit 17 (step ST13).

As a result, even if the horizontal frequencies of the horizontal oscillation circuit 17 and the horizontal deflection circuit 1 are unstable in a transient state until the power is turned off, the switching device has been already placed in the conductive state, thereby preventing an excessive voltage from being applied to the switching device due to unsuitable value of the S-correction capacitor.

Embodiment 2

Figure 6:
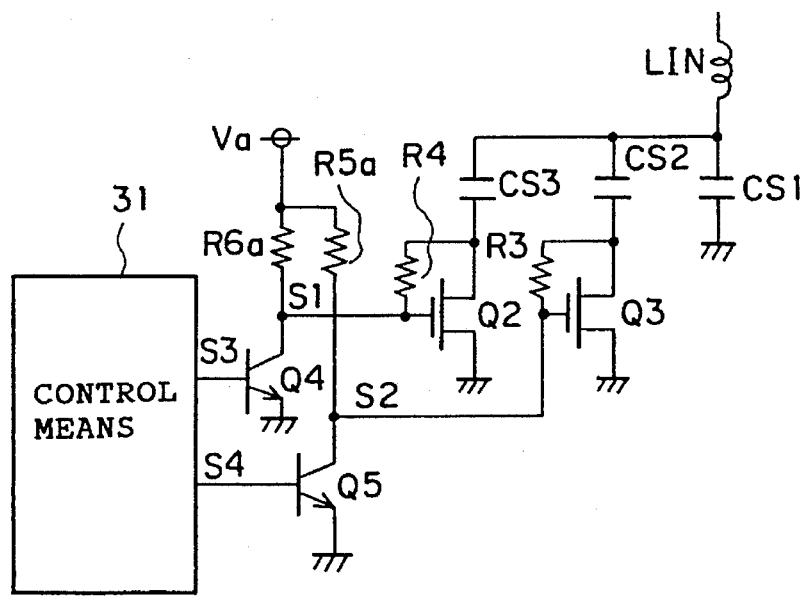
FIG. 6 is a partial circuit diagram showing the connection of S-correction capacitors and switching devices in the S-correction capacitor switching apparatus for a display monitor according to another embodiment of the present invention.

Hereinafter, another embodiment of the present invention will be described. FIG. 6 is a partial circuit diagram showing the connection of the S-correction capacitors and the switching devices in a S-correction capacitor switching apparatus for a display monitor according to the present invention. In FIG. 6, the same reference numerals and symbols are attached to the same components as and equivalent components to those of FIG. 2 and the description thereof is omitted. Referring to FIG. 6, reference Q4 designates a control signal inverting transistor for inverting the polarity of a switching device control signal S3 output from the control means 31 and supplying the switching device control signal S3 to the gate terminal of the switching device Q2. Reference symbol Q5 designates a control signal inverting transistor for inverting the polarity of a switching device Control signal S4 output from the control means 31 and supplying the inverted signal S2 to the gate terminal of the transistor Q3. Reference symbol R3 designates a resistor (switching device protective circuit) coupled between the drain and the gate of the switching device Q3, reference symbol R4 designates a resistor (switching device protective circuit) coupled between the drain and gate of the switching device Q2, reference symbol R5a designates a load resistor coupled between the collector of the transistor Q5 and a power supply Va, and reference symbol R6a designates a load resistor coupled between the collector of the transistor Q4 and the power supply Va. According to the present embodiment, after the horizontal frequency of the horizontal deflection circuit set according to the frequency of the horizontal synchronizing signal of an input video signal is stabilized, the control means 31 controls the conductive/nonconductive state of the switching devices Q2 and Q3 and connects a S-correction capacitor suitable for the horizontal frequency to the deflection coil.

Next, the operation of the apparatus according to the Embodiment 2 will be described. First, the phenomenon when the power is turned off will be explained. Assume that the switching device Q2 is in the nonconductive state immediately before the power is turned off. Thus, the power is turned off in such a state that the level of the switching device control signal S3 is "H" so that the transistor Q4 is ON. Then, the switching device control signal having the level "H" output from the control means 31 and the power Va drop to ground level, so that the transistor Q4 is turned off and the switching device Q2 is kept in the nonconductive state. Although the oscillation states of the horizontal oscillation circuit 17 and the horizontal deflection circuit 1 change at this time, it is considered that the output of the horizontal oscillation circuit 17 and the deflection current of the horizontal deflection circuit 1 attenuate gradually with the oscillation. If an excessive voltage is applied to the drain of the switching device Q2 in the transient state when the power is turned off because the switching device Q2 is in the nonconductive state, this excessive voltage is applied to the gate of the switching device Q2 through the resistor R4 so that the switching device Q2 becomes into the conductive state. As a result, the switching device Q2 is protected from an excessive voltage applied to the drain in the transient state when the power is turned off.

Next, the phenomenon when the power is turned on will be described. In this case, even when the oscillations of the horizontal oscillation circuit 17 and the horizontal deflection circuit 1 have started with the power ON, if the switching device control signal S3 has not risen up to the level "H", and if the power supply Va has not risen up sufficiently either, the transistor Q4 will be OFF and the switching device Q2 will be in the nonconductive state, so that there is a possibility in that an excessive voltage is applied to the switching device Q2. However, even in such a case, the aforementioned voltage is applied to the gate of the switching device Q2 through the resistor R4, so that the switching device Q2 becomes into the conductive state, resulting in that the switching device Q2 is protected.

Embodiment 3

Figure 7:
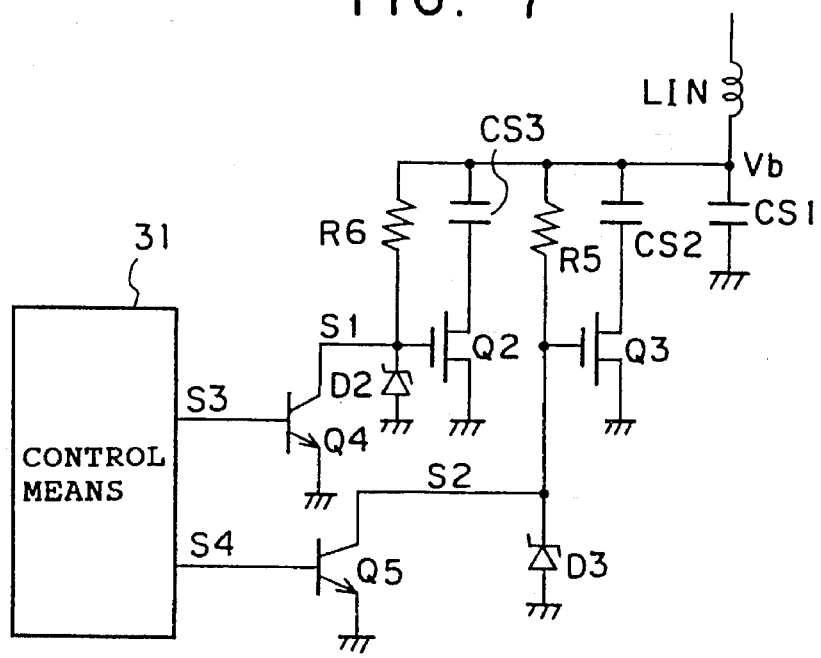
FIG. 7 is a partial circuit diagram showing the connection of S-correction capacitors and switching devices in the S-correction capacitor switching apparatus for a display monitor according to still another embodiment of the present invention.

Hereinafter, still another embodiment of the present invention will be described. FIG. 7 is a partial circuit diagram showing the connection of the S-correction capacitors and the switching devices in a S-correction capacitor switching apparatus for a display monitor according to this embodiment. In FIG. 7, the same reference numerals and symbols are attached to the same components as and equivalent components to those shown in FIG. 6 and the description thereof is omitted. In this embodiment, respective ends of the resistors (switching device protective circuit) R5 and R6 are coupled with common connecting points between the S-correction capacitor CS1, the S-correction capacitor CS2 and the S-correction capacitor CS3, another end of the resistor R5 is coupled with the gate of the switching device Q3 and another end of the resistor R6 is coupled with the gate of the switching device Q2. A reference diode D2 is coupled between the gate of the switching device Q2 and the ground, and a reference diode D3 is coupled between the gate of the switching device Q3 and the ground. These reference diodes D2 and D3 are coupled to prevent an excessive voltage from being applied to the gates of the switching devices Q2, Q3.

Next, the operation of the apparatus according to this embodiment will be described. First, the phenomenon when the power is turned off will be described. Even when the switching device control signals S3 and S4 are at the level "H", they drop to the ground level gradually when the power is turned off, so that the transistors Q4, Q5 are turned off. If a voltage occurs at common connecting points between the S-correction capacitors CS1, CS2, and CS3, this voltage is applied to the gates of the switching devices Q2 and Q3 through the resistors R5, R6, so that the voltages of the gates of the switching devices Q2 and Q3 are held at the voltages corresponding to the zener voltages of the regular diodes D2, D3, thereby making the switching devices Q2 and Q3 into the conductive state.

Thus, if a voltage occurs at common connecting points between the S-correction capacitors CS1, CS2, and CS3 when the power is turned off, there is a possibility that oscillation continues in the horizontal deflection circuit. Even if an excessive voltage is applied to the switching devices Q2 and Q3 consequently, the switching devices Q2 and Q3 are protected because they are conductive.

When the power is turned on, even if the switching device control signals S3 and S4 have not risen to the level "H" when the power is turned on, the voltage Vb occurs at common connecting points between the S-correction capacitors CS1, CS2 and CS3 as long as the horizontal deflection circuit has started to oscillate, so that the switching devices Q2 and Q3 can be made into the conductive state, thereby protecting the switching devices Q2 and Q3 from an excessive voltage which may be applied thereto.

Embodiment 4

Figure 10:
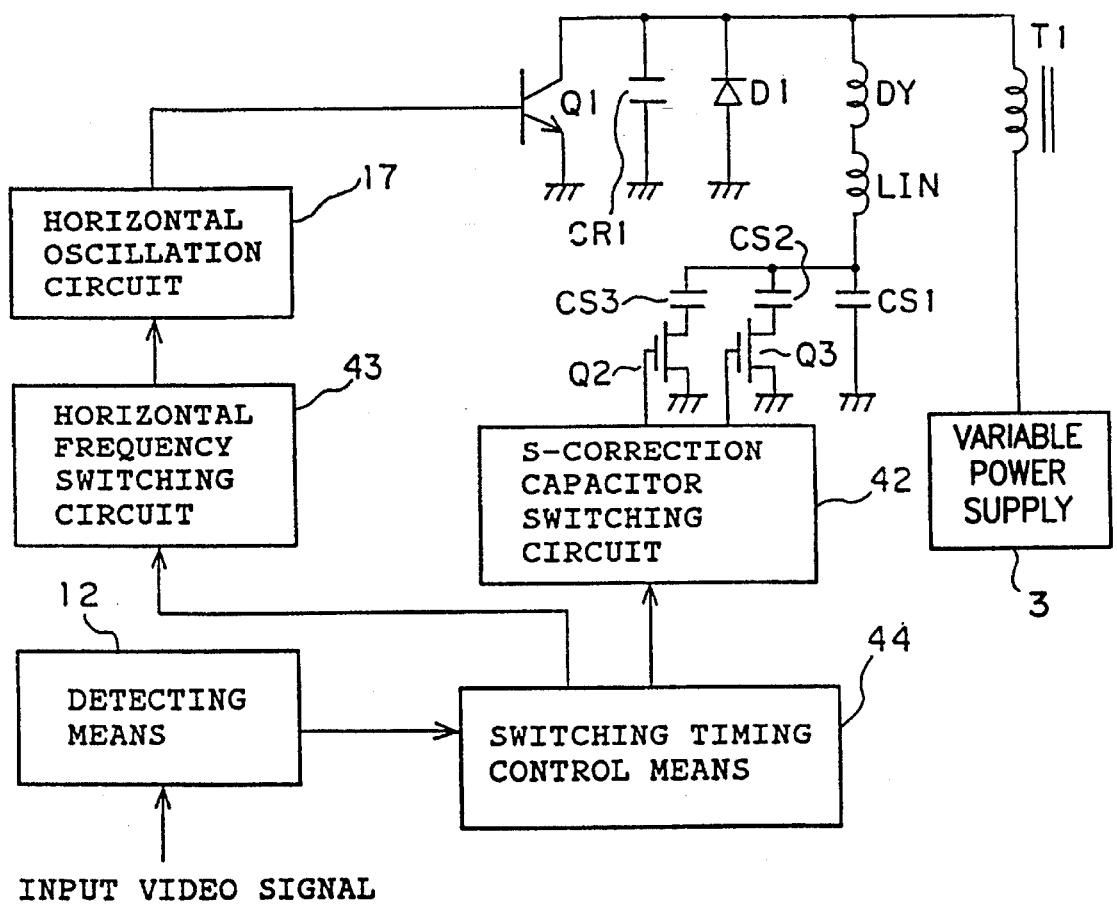
FIG. 10 is a block diagram showing the construction of a S-correction capacitor switching apparatus for a display monitor according to the embodiment shown in FIG. 8.

Hereinafter, a further embodiment of the present invention will be described with reference to accompanying drawings. FIG. 10 is a block diagram showing the construction of a S-correction capacitor switching apparatus for a display monitor according to this embodiment. In FIG. 10, the same reference numerals and symbols are attached to the same components as and equivalent components to those shown in FIG. 2 and the description thereof is omitted. Referring to the Figure, reference numeral 42 designates a S-correction capacitor switching circuit for switching S-correction capacitors to be connected to a deflection coil by controlling the conductive/nonconductive state of the switching devices Q2 and Q3 by means of a switching device control signal, numeral 43 designates a horizontal frequency switching circuit for switching the horizontal frequency of a horizontal deflection circuit corresponding to the frequency of a detected horizontal synchronizing signal, and numeral 44 designates a switching timing control means for controlling the aforementioned horizontal frequency switching circuit 43 and the aforementioned S-correction capacitor switching circuit 42 according to an inverse time relationship between switching of the horizontal frequency by means of the aforementioned horizontal frequency switching circuit 43 and switching of the conductive/nonconductive state of the switching devices Q2 and Q3 by means of a switching device control signal depending on each time of when the frequency of a horizontal synchronizing signal detected by the detecting means 12 changes from a low frequency to a high frequency and when it changes from a high frequency to a low frequency.

Figure 8:
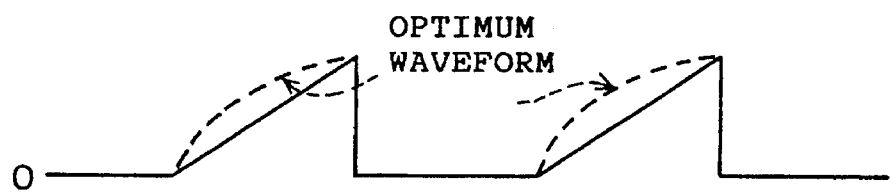
FIG. 8 is a diagram showing the oscillation waveform of horizontal deflection current in a S-correction capacitor for a display monitor according to still another embodiment of the present invention.
Figure 9:
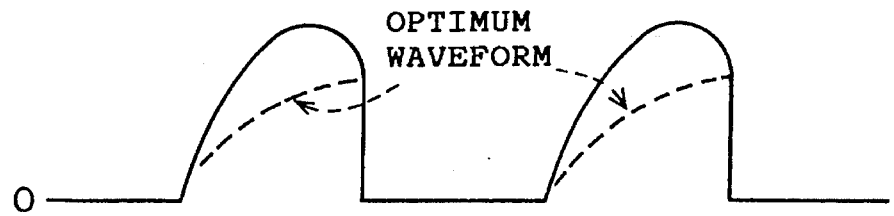
FIG. 9 is a diagram showing the oscillation waveform of horizontal deflection current in a S-correction capacitor switching apparatus for a display monitor according to the embodiment of the present invention shown in FIG. 8.

In switching the S-correction capacitor, the horizontal frequency has an optimum value for the S-correction capacitor depending on the frequency thereof (if the horizontal frequency is low, the value of the S-correction capacitor is large, and if the horizontal frequency is high, the value of the S-correction capacitor is small). If the value of the S-correction capacitor is larger than this optimum value, a deflection current as shown in FIG. 8 flows, and if the value of the S-correction capacitor is smaller than the optimum value, a deflection current as shown in FIG. 9 flows through a transistor Q1. Thus, according to this embodiment, although the horizontal output transistor Q1 is not over-loaded when the value of the S-correction capacitor is larger than its optimum value, if the value of the S-correction capacitor is smaller than the optimum value, the horizontal output transistor Q1 is over-loaded. Thus, the horizontal output transistor Q1 is prevented from being over-loaded by controlling the horizontal frequency of the horizontal deflection circuit and the switching order of the S-correction capacitor.

Figure 11:
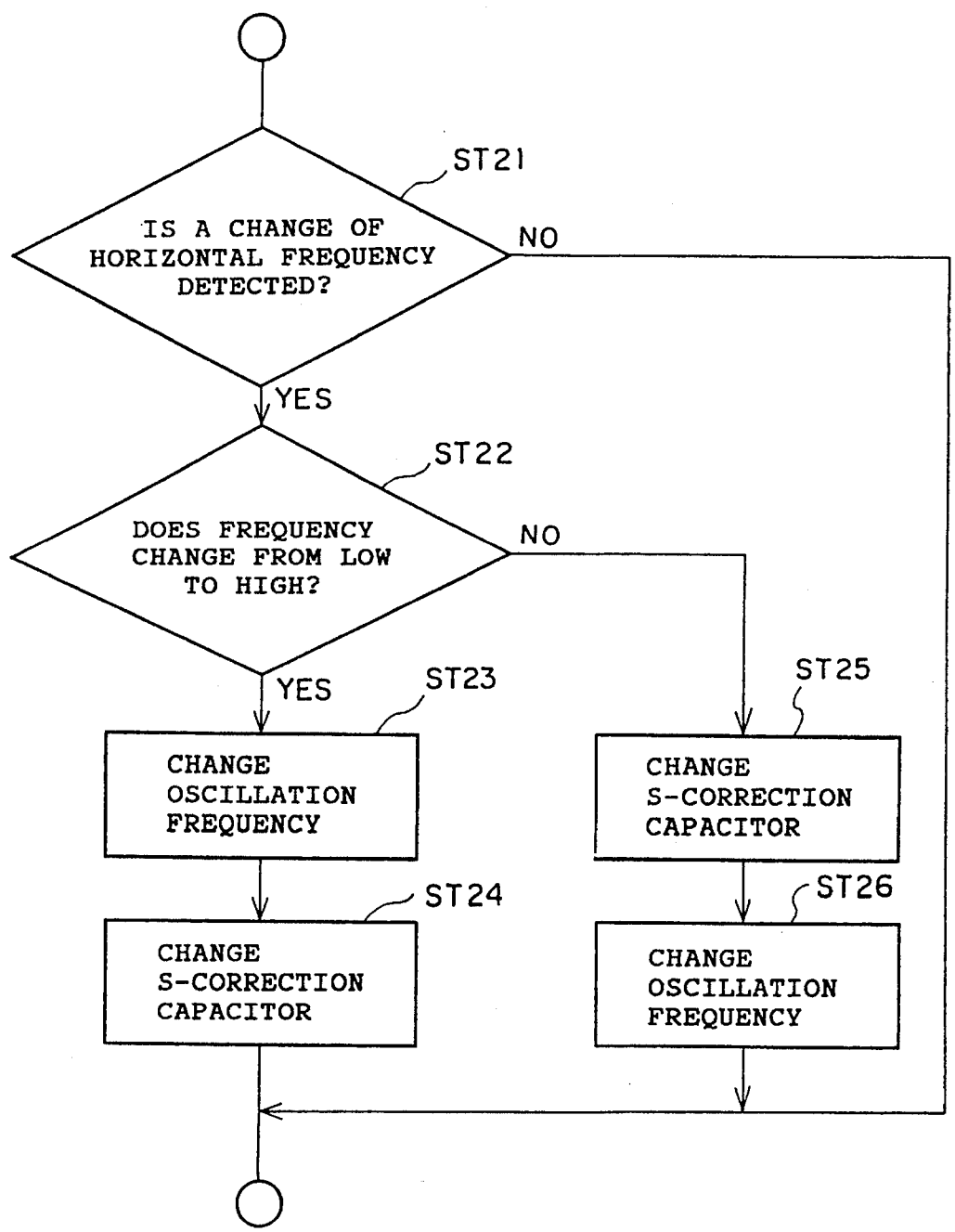
FIG. 11 is a flow chart showing the operation of a display monitor according to the embodiment shown in FIG. 8.

Next, the operation of the apparatus according to this embodiment will be described. FIG. 11 is a flow chart showing the operation of a S-correction capacitor switching apparatus for a display monitor according to this embodiment. Referring to this flow chart, a change of the horizontal frequency is detected (step ST21), that is whether the detected horizontal frequency changes from a low frequency to a high frequency or it changes from a high frequency to a low frequency is determined (step ST22). When it is determined that the horizontal frequency changes from a low frequency to a high frequency, the oscillation frequency of the output of the horizontal oscillation circuit 17 is changed to change the horizontal frequency of the horizontal deflection circuit (step ST23) and the value of the S-correction capacitor is changed by controlling the conductive/nonconductive state of the switching devices Q2 and Q3 (step ST24). On the other hand, if it is determined that the horizontal frequency changes from a high frequency to a low frequency on the step ST22, the value of the S-correction capacitor is changed by controlling the conductive/nonconductive state of the switching devices Q2 and Q3 (step ST25), and then the oscillation frequency of the output of the horizontal deflection circuit 17 is changed (step ST26).

As a result, when the horizontal frequency changes, the value of the S-correction capacitor is always larger than its optimum value and the horizontal output transistor Q1 is not over-loaded, thereby increasing the reliability.

As described above, according to the first aspect of the present invention, since the apparatus comprises control means for making all of a plurality of switching devices into the conductive state immediately before the power of a display monitor is turned on, controlling the conductive/nonconductive state of a switching device corresponding to a horizontal frequency after the horizontal frequency of the horizontal deflection circuit set according to the frequency of the horizontal synchronizing signal of an input video signal is stabilized after the power is turned on, and coupling a S-correction capacitor suitable for the frequency of the horizontal synchronizing signal of an input video signal to a deflection coil, it is possible to prevent an overload from being applied to a switching device when the power is turned on and to prevent deterioration of the switching device when the power is turned on.

According to the second aspect of the present invention, since the apparatus comprises detecting means for detecting the frequency of the horizontal synchronizing signal of an input video signal and a setting means for setting the horizontal frequency of a horizontal deflection circuit corresponding to the frequency of a horizontal synchronizing signal detected by the detecting means, it is possible to prevent an overload from being applied to the switching device when the power is turned on and to prevent deterioration of the switching device when the power is turned on.

According to the third aspect of the present invention, since the apparatus comprises a determining means for determining whether the horizontal frequency is stabilized from the fact that a predetermined time has elapsed since a horizontal frequency is set, it is possible to determine easily whether the horizontal frequency is stabilized, prevent an excessive voltage from being applied to the switching device when the power is turned on, and prevent deterioration of the switching device when the power is turned on.

According to the fourth aspect of the present invention, since the apparatus comprises power shut-down control means for making a plurality of the switching devices into the conductive state according to a switching device control signal when the operation of turning off the power of a display monitor is performed and turning off the power of the display monitor thereafter, it is possible to prevent an excessive voltage from being applied to the switching device when the power is turned off and deterioration of the switching device when the power is turned off.

According to the fifth aspect of the present invention, since the apparatus includes a switching device protective circuit for introducing a voltage higher than a predetermined value at a conjunction point between the switching device and the S-correction capacitor to the control terminal of the aforementioned switching device to which a switching device control signal is to be input when the switching device is in the nonconductive state when the power of a display monitor is turned on or turned off, in order to make the aforementioned switching device into the conductive state, it is possible to prevent an excessive voltage from being applied to the switching device when the power is turned on or off and to prevent deterioration of the switching device when the power is turned on or off.

According to the sixth aspect of the present invention, since the apparatus comprises a switching device protective circuit for introducing a voltage higher than a predetermined value at a common conjunction point of a plurality of S-correction capacitors to the control terminal of the aforementioned switching device to which a switching device control signal is to be input when the switching device is in the nonconductive state when the power of a display monitor is turned on or off in order to make the aforementioned switching device into the conductive state, it is possible to prevent an excessive voltage from being applied to the switching device when the power is turned on or off and deterioration of the switching device when the power is turned on or off.

According to the seventh aspect of the present invention, since the apparatus comprises switching timing control means for controlling a horizontal timing control circuit and a S-correction capacitor switching circuit according to an inverse timely relationship between switching of the horizontal frequency of the horizontal deflection circuit by means of a horizontal frequency switching circuit and switching of the conductive/nonconductive state of a switching device by means of a switching device control signal depending on when a detected frequency changes from a low frequency to a high frequency and when it changes from a high frequency to a low frequency, it is possible to prevent deterioration of a switching device which is a horizontal output transistor when the horizontal frequency changes.

What is claimed is:

1. A S-correction capacitor apparatus for a display monitor, comprising:

a plurality of S-correction capacitors electrically coupled with an end of a deflection coil together with a first S-correction capacitor coupled with an end of said deflection coil, for adjusting deflection current and improving the linearity of a display screen according to a frequency of a horizontal synchronizing signal of an input video signal;

a plurality of switching devices coupled in series with said S-correction capacitors for electrically coupling each of said plurality of S-correction capacitors with said deflection coil according to a switching device control signal; and control means for setting the plurality of said switching devices into a conductive state immediately before the power of a display monitor is turned on, controlling the conductive/nonconductive state of said switching device corresponding to a horizontal frequency after the horizontal frequency of the horizontal deflection circuit set according to the frequency of the horizontal synchronizing signal of an input video signal is stabilized after the power is turned on and coupling a S-correction capacitor suitable for the frequency of a horizontal synchronizing signal of the input video signal to said deflection coil.

2. A S-correction capacitor switching apparatus for a display monitor according to claim 1, comprising:

detecting means for detecting the frequency of the horizontal synchronizing signal of an input video signal; and setting means for setting the horizontal frequency of a horizontal deflection circuit corresponding to the frequency of a horizontal synchronizing signal detected by said detecting means.

3. A S-correction capacitor switching apparatus for a display monitor according to claim 2 further comprising:

determining means for determining whether the horizontal frequency is stabilized based on whether a predetermined time has elapsed since a horizontal frequency is set by said setting means.

4. A S-correction capacitor apparatus for a display monitor, comprising:

a plurality of S-correction capacitors electrically coupled with an end of a deflection coil together with a first S-correction capacitor coupled with an end of said deflection coil, for adjusting deflection current and improving the linearity of a display screen according to frequency of a horizontal synchronizing signal of an input video signal;

a plurality of switching devices series coupled with said S-correction capacitors for electrically coupling each of said plurality of S-correction capacitors with said deflection coil according to a switching device control signal, and control means for setting a plurality of said switching devices into the conductive state according to said switching device control signal when the operation for turning off a power of a display monitor is performed, and then turning off the power of said display monitor thereafter.

5. A S-correction capacitor apparatus for a display monitor, comprising:

a plurality of S-correction capacitors electrically coupled with an end of a deflection coil together with a first S-correction capacitor coupled with an end of said deflection coil for adjusting deflection current and improving the linearity of a display screen according to a frequency of a horizontal synchronizing signal of an input video signal;

a plurality of switching devices coupled in series with said S-correction capacitors for electrically coupling each of said plurality of S-correction capacitors with said deflection coil according to a switching device control signal;

a switching device protective circuit for introducing a voltage higher than a predetermined value at a conjunction point between a switching device and a S-correction capacitor to a control terminal of said switching device to which a switching device control signal is to be input when said switching device is in the nonconductive state when the power of a display monitor is turned on or off to set said switching device into a conductive state; and control means which, after a horizontal frequency of a horizontal deflection circuit set according to the horizontal synchronizing signal of an input video signal is stabilized, controls a conductive/nonconductive state of said switching device according to said horizontal frequency and outputs said switching device control signal for coupling a S-correction capacitor suitable for said horizontal frequency to said deflection coil.

6. A S-correction capacitor switching apparatus for a display monitor, comprising:

a plurality of S-correction capacitors having a common conjunction point electrically coupled with an end of a deflection coil together with a first S-correction capacitor coupled with an end of said deflection coil for adjusting deflection current and improving linearity of a display screen according to a frequency of a horizontal synchronizing signal of an input video signal;

a plurality of switching devices series coupled with said S-correction capacitors for electrically coupling each of said plurality of S-correction capacitors with said deflection coil according to a switching device control signal, a switching device protective circuit for introducing a voltage at a common conjunction point of said plurality of the S-correction capacitors to a control terminal of a switching device to which a switching device control signal is to be input when the switching device is in a nonconductive state when the power of a display monitor is turned on or off; and control means which, after a horizontal frequency of a horizontal deflection circuit set according to the horizontal synchronizing signal of input video signal is stabilized, controls the conductive/nonconductive state of said switching device according to said horizontal frequency and outputs said switching device control signal for coupling a S-correction capacitor suitable for said horizontal frequency to said deflection coil.

7. A S-correction capacitor switching apparatus for a display monitor, comprising:

a plurality of S-correction capacitors electrically coupled with an end of a deflection coil together with a first S-correction capacitor coupled with an end of said deflection coil for adjusting deflection current and improving linearity of a display screen according to a frequency of a horizontal synchronizing signal of an input video signal;

a plurality of switching devices coupled in series with said S-correction capacitors for electrically coupling each of said plurality of the S-correction capacitors with said deflection coil according to a switching device control signal;

means for detecting the frequency of the horizontal synchronizing signal of the input video signal;

a horizontal frequency switching circuit for switching a horizontal deflection signal of the horizontal deflection circuit according to a frequency detected by said detecting means;

a S-correction capacitor switching circuit for switching a S-correction capacitor to be coupled with said deflection coil by controlling the conductive/nonconductive state of said switching device according to a switching device control signal; and switching timing control means for controlling a horizontal timing control circuit and said S-correction capacitor switching circuit according to an inverse time relationship between switching of the horizontal frequency, by means of said horizontal frequency switching circuit and for controlling switching of the conductive/nonconductive state of said switching device by means of a switching device control signal, depending on a frequency detected by said detecting means changing from a low frequency to a high frequency or changing from a high frequency to a low frequency.

* * * * *